US012450607B2

(12) United States Patent
Kielak et al.

(10) Patent No.: US 12,450,607 B2
(45) Date of Patent: Oct. 21, 2025

(54) DEEP BEHAVIORAL NETWORKS FOR FRAUD DETECTION

(71) Applicant: FEATURESPACE LIMITED, Cambridge (GB)

(72) Inventors: Kacper Kielak, Cambridge (GB); Kenny Wong, Cambridge (GB); Marco Barsacchi, Cambridge (GB); David Sutton, Milton Cambridge (GB); Jason Wong, Cambridge (GB)

(73) Assignee: Featurespace Limited, Cambridge (GB)

( * ) Notice: Subject to any disclaimer, the term of this patent is extended or adjusted under 35 U.S.C. 154(b) by 48 days.

(21) Appl. No.: 17/338,824

(22) Filed: Jun. 4, 2021

(65) Prior Publication Data

US 2022/0012742 A1 Jan. 13, 2022

Related U.S. Application Data

(60) Provisional application No. 63/049,873, filed on Jul. 9, 2020.

(51) Int. Cl.
*G06Q 20/40* (2012.01)
*G06N 3/04* (2023.01)
(Continued)

(52) U.S. Cl.
CPC .......... *G06Q 20/4016* (2013.01); *G06N 3/04* (2013.01); *G06N 3/045* (2023.01); *G06Q 20/085* (2013.01);
(Continued)

(58) Field of Classification Search
CPC .................................................. G06Q 20/4016
See application file for complete search history.

(56) References Cited

U.S. PATENT DOCUMENTS

2006/0059568 A1   3/2006 Smith-Michelson et al.
2008/0120166 A1*  5/2008 Fernandez ............. G06Q 30/02
                                                              702/179
(Continued)

FOREIGN PATENT DOCUMENTS

CN   107645533   *   8/2016   ......... G06Q 20/4016
GB   2321362         7/1998
(Continued)

OTHER PUBLICATIONS

Longfei Li, Ziqi Liu, Chaochao Chen, Jun Zhou, Xiaolong Li, A Time Attention based Fraud Transaction Detection Framework, Conference'17, Jul. 2017, Washington DC, USA (Year: 2017).*

(Continued)

*Primary Examiner* — Hao Fu
(74) *Attorney, Agent, or Firm* — King & Spalding

(57) ABSTRACT

A transaction processing system includes a transaction processing module configured to receive first information associated with a first proposed transaction, retrieve second information associated with at least one prior transaction that is associated with the first proposed transaction, and calculate a time-decayed algorithm using the second information to generate third information. The transaction processing system also includes a weighting module communicably coupled to the transaction processing module, wherein the weighting module is configured to receive the third information from the neural-based processing module, apply a weighting factor to the third information to generate fourth information, and calculate at least one processing algorithm using the first information and the fourth information to generate an output. The output of the weighting module is used by an additional transaction processing module to determine whether the first proposed transaction is fraudulent.

16 Claims, 6 Drawing Sheets

(51) Int. Cl.
*G06N 3/045* (2023.01)
*G06Q 20/08* (2012.01)
*G06Q 20/38* (2012.01)
*G06Q 40/02* (2023.01)

(52) U.S. Cl.
CPC ....... *G06Q 20/389* (2013.01); *G06Q 20/4015* (2020.05); *G06Q 40/02* (2013.01)

(56) References Cited

U.S. PATENT DOCUMENTS

| | | |
|---|---|---|
| 2014/0180974 A1 | 6/2014 | Kennel et al. |
| 2017/0230404 A1 | 8/2017 | Ramos De Araujo et al. |
| 2021/0248448 A1 | 8/2021 | Branco et al. |

FOREIGN PATENT DOCUMENTS

| | | |
|---|---|---|
| WO | WO 2019/050864 | 3/2019 |
| WO | WO 2019/050865 | 3/2019 |
| WO | WO 2020/088007 | 5/2020 |
| WO | WO 2022/008130 | 1/2022 |

OTHER PUBLICATIONS

International Search Report for PCT/EP2021/063766, issued Oct. 6, 2021.
International Search Report for PCT /EP2021/063767, issued Oct. 25, 2021.
Search and Examination Report for UK Patent Application No. 2107388.7, issued Jul. 15, 2021.
Search and Examination Report for UK Patent Application No. 2107389.5, issued Jul. 14, 2021.
Longfei Li et al: "A Time Attention based Fraud Transaction Detection Framework", arxiv.org, Cornell University Library, 201 Olin Library Cornell University Ithaca, NY 14853, Dec. 26, 2019.
Xurui Li et al: "Transaction Fraud Detection Using GRU-centered Sandwich-structured Model", arxiv.org, Cornell University Library, 201 Olin Library Cornell University Ithaca, NY 14853, Nov. 4, 2017.
Liu Guannan et al: "Fraud detection via behavioral sequence embedding", Knowledge and Information Systems, Springer Verlag, London, GB, vol. 62, No. 7, Jan. 9, 2020.
Vaswani et al., "Attention Is All You Need", available at: https://arxiv.org/abs/1706.03762v5 [accessed Jul. 13, 2021].
Chou Hsin-Ping et al: "Remix: Rebalanced Mixup" In: "Advances in Intelligent Data Analysis XIX". Jul. 8, 2020.
Connor Shorten et al: "A survey on Image Data Augmentation for Deep Learning", Journal of Big Data, vol. 6, Jul. 6, 2019.
Refka Abdellaoui et al: "Secure Communication for Internet Payment in Heterogeneous Net-works", Advanced Information Networking and Applications (AINA), 2010 24th IEEE International Conference on, IEEE, Piscataway, NJ, USA, Apr. 20, 2010 (Apr. 20, 2010), pp. 1085-1092.
International Search Report for PCT/EP2022/061405, issued Dec. 20, 2022.
Search and Examination Report for GB Patent Application No. GB2206208.7, issued Oct. 25, 2022.
STEYN: "Semi-services learning for textual anomaly detection", 2016 Pattern Recognition Association of South Africa and Robotics and Mechatronics International Conference, Stellenbosch, South Africa, 2016.
Prusti, "Fraudulent Transaction Detection in Credit Card by Applying Machine Learning Tech-niques," 2016.

\* cited by examiner

DEEP BEHAVIORAL NETWORKS FOR FRAUD DETECTION

CROSS REFERENCE TO RELATED APPLICATIONS

This application claims the benefit of U.S. Provisional Application No. 63/049,873, filed Jul. 9, 2020, which is incorporated by reference herein in its entirety.

TECHNICAL FIELD

Embodiments described herein relate generally to fraud detection, and more particularly to systems, methods, and devices for using deep behavioral networks to detect fraud.

BACKGROUND

Fraud is a crime, and financial institutions are obliged to take reasonable steps to prevent it. One of these steps is the interruption and cessation of a transaction while it is in-flight. This prevents financial losses for either of the genuine parties in the transaction. Some decision process is needed to determine if the transaction is valid, and those decision processes use risk scores as one data point for that decision. Consumers and merchants, and commerce in general is disrupted when transactional fraud is falsely detected (a "false positive") or fails to be detected, leading to a reduction in credit availability and disputed transactions or financial loss.

While risk scoring and evaluation methodologies for fraud have existed for decades, they have been of limited predictive quality. More and more accurate risk scores are actively sought by parties to transactions, as the accuracy of these scores directly impacts their financial well-being, confidence in transacting business electronically or in person, and the effectiveness of crime prevention strategies.

BRIEF DESCRIPTION OF THE DRAWINGS

The drawings illustrate only example embodiments of using deep behavioral networks to detect fraud and are therefore not to be considered limiting of its scope, as using deep behavioral networks to detect fraud may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
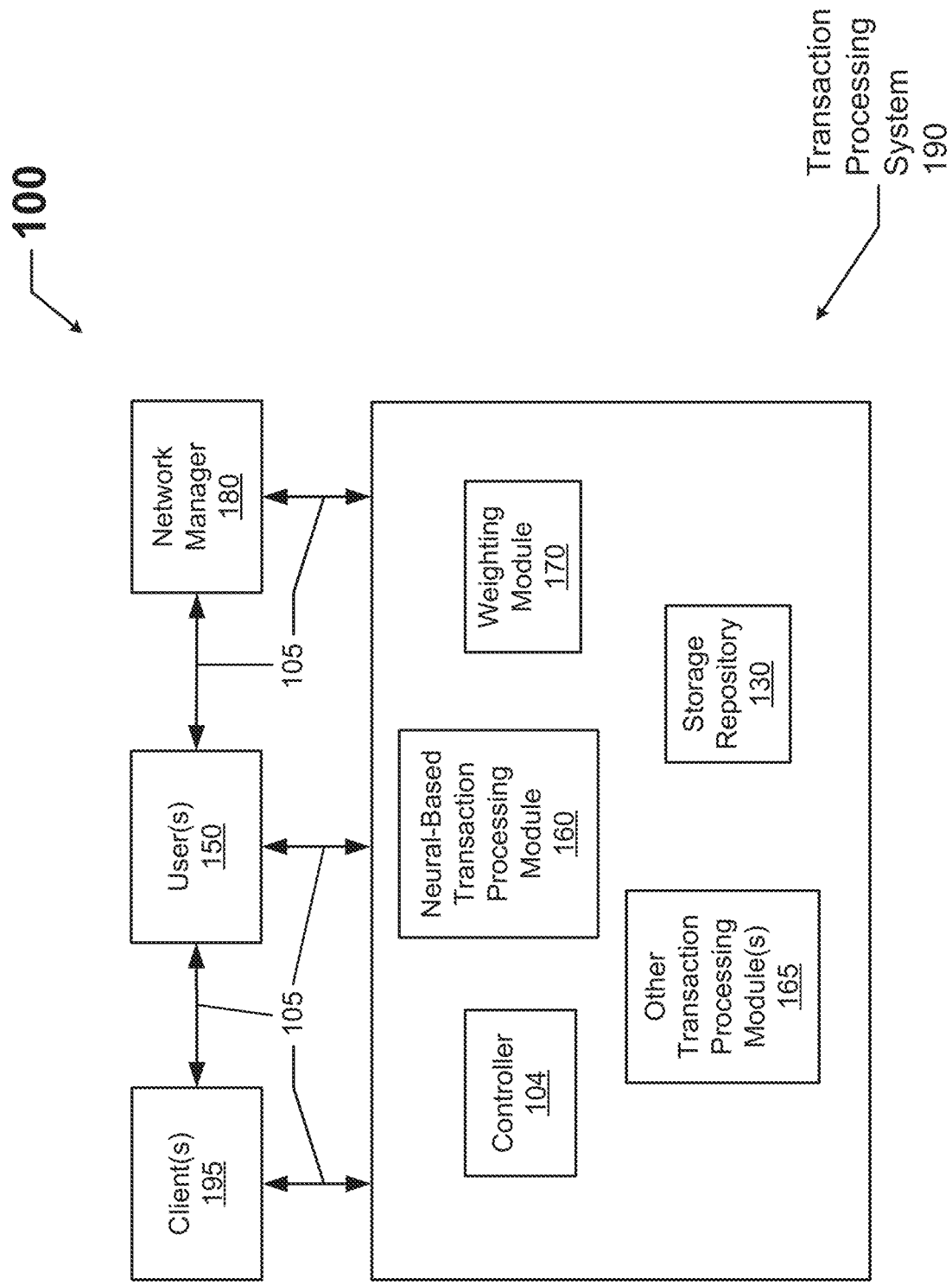
FIG. 1 shows a diagram of a system in accordance with certain example embodiments.

The example embodiments discussed herein are directed to systems, methods, and devices for deep behavioral networks to detect fraud. Example embodiments can be used to detect fraud in any of a number of circumstances, including but not limited to credit card charges, automated payments (e.g., as from a checking account), electronic (non-credit card) money transfers, and applications for credit. Example embodiments (or portions thereof) can also be used in cyber-security to detect malicious actors, and in financial crime to detect money laundering. Further, example embodiments can be used to detect fraud in real time (as for pending transactions) and historically (e.g., by analyzing information associated with past transactions as a "look-back").

Example embodiments accurately evaluate and weigh behavioral anomalies present in sequences of individual actions (e.g., transactions, user mouse clicks), where those actions are irregularly spaced in time rather than occurring at regular intervals. With this irregularly spaced data, the behavioral context of neighboring actions, or the lack of such neighboring actions, in a sequence changes depending on the time gap between the actions. For example, two purchases within a second mean something quite different to two purchases separated by a day.

Current deep learning methods may not accurately measure such differences, which leads to errors and suboptimal results in application of machine learning to these data sets. A deep behavioral network measures the differences more accurately than the current deep learning methods. Example embodiments use a machine learning architecture that seeks to identify and make inferences from behavioral anomalies so that there is an appropriate awareness of the intervals and densities of individual actions of different types, and how these recent measures compare to the established long-term trends of the individual. Example embodiments use the deep behavioral network, which is a neural architecture that allows for representations of behavioral norms and anomalies to be learned from data, including evaluating the semantic interpretation, actual and expected frequency, sequencing, and temporal distance between actions and behavior. In some cases, one or more functions performed by example embodiments described herein are performed using other types of architecture aside from neural architectures.

In transactional processing, some preliminarily valid transactions will later be reported as fraud, where a third party fraudulently initiated a transaction in the name of one of the participants to the transaction, such as an account holder or merchant. Financial institutions spend a great deal of resources to implement solutions for real-time fraud prediction for in-flight transactions, often against a constantly evolving set of threat vectors. Fraud prediction through behavioral analysis, as used in example embodiments, is an important application of the measurement of transactional and account norms and anomalies in this type of data.

In certain example embodiments, fraud detection systems are subject to meeting certain standards and/or requirements. Examples of entities that create such standards and regulations include, but are not limited to, the Association of Certified Fraud Examiners (ACFE), the Securities and Exchange Commission (SEC), and the Professional Risk Managers' International Association (PRMIA).

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of using deep behavioral networks to detect fraud will be described more fully hereinafter with reference to the accompanying drawings, in which example embodiments of using deep behavioral networks to detect fraud are shown. Using deep behavioral networks to detect fraud may, however, be embodied in many different forms and should not be construed as limited to the example embodiments set forth herein. Rather, these example embodiments are provided so that this disclosure will be thorough and complete, and will fully convey the scope of using deep behavioral networks to detect fraud to those of ordinary skill in the art. Like, but not necessarily the same, elements (also sometimes called components) in the various figures are denoted by like reference numerals for consistency.

Terms such as "first", "second", "on", "upon", "outer", "inner", "top", "bottom", and "within" are used merely to distinguish one component (or part of a component or state of a component) from another. Such terms are not meant to denote a preference or a particular orientation. Also, such terms are not meant to limit embodiments of using deep behavioral networks to detect fraud. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a system 100 in accordance with certain example embodiments. In this case, the system 100 includes one or more clients 195, one or more users 150, a network manager 180, and a transaction processing system 190. The transaction processing system 190 can include one or more components. In this case, the transaction processing system 190 includes a controller 104, a neural-based transaction processing module 160 (sometimes more simply called a transaction processing module 160 herein), a weighting module 170, one or more other transaction processing modules 165, and a storage repository 130.

The controller 204 can include one or more of a number of components. Such components can include, but are not limited to, a control engine, a communication module, a timer, an energy metering module, a power module, a hardware processor, a memory, a transceiver, an application interface, an energy storage device, one or more switches, and, a security module. The components shown in FIG. 1 are not exhaustive, and in some embodiments, one or more of the components shown in FIG. 1 may not be included in an example system 100. Any component of the example system 100 can be discrete or combined with one or more other components of the system 100.

A user 150 can be any person that interacts with the one or more clients 195, the network manager 180, and the transaction processing system 190. Examples of a user 150 may include, but are not limited to, an executive, security personnel, a risk manager, an engineer, a consultant, a law enforcement officer, a contractor, and a manufacturer's representative. As sometimes described herein, a user 150 can be a human being, an organization, or a computer. The user 150 can be or include a user system (not shown), which may include a display (e.g., a GUI), a mouse, a keyboard, and/or other I/O components. Such a user system can correspond to a computer system as described below with regard to FIG. 2. The user 150 interacts with (e.g., sends data to, receives data from) the one or more clients 195, the network manager 180, and/or the transaction processing system 190 (or components thereof).

Interaction between each user 150, the network manager 180, the one or more clients 195, and the transaction processing system 190 (or components thereof) is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, Bluetooth Low Energy (BLE), Ultra Wideband (UWB)) technology. Similarly, communication between components of the transaction processing system 190 can be facilitated by communication links 105. The communication link 105 can transmit signals (e.g., power signals, communication signals, control signals, data) between the users 150, the network manager 180, the client(s) 195, and/or transaction processing system 190 (including components thereof).

The network manager 180 is a device or component that controls all or a portion of the system 100, which can include the controller 104 of the transaction processing system 190. The network manager 180 can be substantially similar (e.g., in terms of components, in terms of functionality) to the controller 104. Alternatively, the network manager 180 can include one or more of a number of features in addition to, or altered from, the features of the controller 104 of the transaction processing system 190. The network manager 180 can be called by other names, including but not limited to master controller, network controller, and enterprise manager.

The client(s) 195 of the system 100 provide transaction information to the transaction processing system 190. Examples of a client 195 can include, but are not limited to, a merchant, a vendor, a bank, and a financial institution. The transaction information sent by a client 195 to the transaction processing system 190 can include, but is not limited to, an account number (e.g., a credit card number), an account owner, a day and time of a potential transaction, an amount of the transaction, a location of where the transaction is occurring, a vendor seeking authorization of the charge, and manner (e.g., in person, over the phone, on a website) in which the transaction is executed. A single client can transmit transaction information to the transaction processing system 190 at any given point in time or over a range of time. A client 195 can include one or more components (e.g., a transceiver, an application interface, a controller) that allow the client 195 to communicate with and/or follow instructions from a user 150, the controller 104 of the transaction processing system 190, and/or the network manager 180. The transaction processing system 190 can correspond to a computer system as described below with regard to FIG. 2.

In certain example embodiments, the neural-based transaction processing module 160 of the transaction processing system 190 is configured to receive one or more inputs (e.g., transaction information) from one or more other components (e.g., the clients 195) of the system 100. In this case, the neural-based transaction processing module 160 receives inputs in the form of payment (e.g., credit card) transaction information in real time from one or more clients 195 at a given point in time. Upon receiving the payment card transaction information (or other transactional data) from a client 195, the neural-based transaction processing module 160 can immediately process the payment transaction information to generate an output.

Alternatively, upon receiving the payment transaction information from a client 195, the neural-based transaction processing module 160 can use at least some of the payment transaction information to generate a query for additional information. For example, the neural-based transaction processing module 160 can initiate a request, through the controller 104, to obtain records (files) for the 5 (or some other number) most recent transactions by that account (e.g., credit card) with that client 195 and/or similar vendors. The details of such an inquiry can be based, for example, on one or more protocols and/or algorithms, as stored in the storage repository 130, at least some of which can be adjusted based on actual results over time.

The neural-based transaction processing module 160 is configured to send one or more outputs to one or more other components of the system 100. In this case, the neural-based transaction processing module 160 sends outputs to the weighting module 170. In alternative embodiments, the neural-based transaction processing module 160 can additionally or alternatively send its outputs to one or more of the other transaction processing modules 165 of the transaction processing system 190.

The neural-based transaction processing module 160 can have any of a number of configurations. For example, in this case, the neural-based transaction processing module 160 is a layer of neural cells with local memory where the memory is time-decayed prior to state update upon processing of a new sample. In this case, a sample, also sometimes called an input, is a transaction that may or may not be fraudulent. The neural cells of the neural-based transaction processing module 160 are updated additively when a new sample is processed. The pre-existing state may be time-decayed (e.g., exponentially, by a custom created factor) based on the time interval between the previous sample in the sequence and the current sample.

The purpose of the neural-based transaction processing module 160 is to compute a weighted summation of the new input relative to the prior inputs. The basis of the time-decay drives the contribution of past transactions to the summation. The basis of the time-decay can be purely a function of the time, since the transaction occurred independent of anything that happened in the intervening period. As a result, the significance of the basis for the time-decay is that it provides long-term storage for the contribution of prior transactions that are not the most recent transaction.

As an example of how the neural-based transaction processing module 160 can work, consider a case with three transactions. The first transaction (event A) occurs at midnight. The second transaction (event B) occurs at 3 a.m. (i.e., 3 hours after event A). The third transaction (event C) occurs at 9 a.m. (i.e., 6 hours after event B and 9 hours after event A). When the neural-based transaction processing module 160 determines the memory state $S_{\{i\}}$ for the then-current event, the neural-based transaction processing module 160 decays the previous memory state $S_{\{i-1\}}$ based on the interval between the then-previous event (i−1) and the then-current event (i), before adding it to the inputs $X_i$ for the then-current event. For every update, the neural-based transaction processing module 160 calculates the memory state $S_{\{i\}}=X_{\{i\}}+f(t_{\{i\}}-t_{\{i-1\}})\cdot S_{\{i-1\}}$.

For event A in this example, the neural-based transaction processing module 160 calculates that $S_a=X_a+0$.

For event B in this example, the neural-based transaction processing module 160 calculates that $S_b=X_b+f(3\text{ hours})\cdot S_a$.

For event C in this example, the neural-based transaction processing module 160 calculates that $S_c=X_c+f(6\text{ hours})\cdot S_b$, which is equivalent to $S_c=X_c+f(6\text{ hours})\cdot X_b+f(6\text{ hours})\cdot f(3\text{ hours})\cdot X_a$.

When the time decay is exponential, $f(a)\cdot f(b)=f(a+b)$. In such a case, the memory state for event C can be expressed as $S_c=X_c+f(6\text{ hours})\cdot S_b=X_c+f(6\text{ hours})\cdot X_b+f(6\text{ hours})\cdot f(3\text{ hours})\cdot X_a=X_c+f(6\text{ hours})\cdot X_b+f(9\text{ hours})\cdot X_a$. As a result, the contribution of event A to $S_c$ is dependent only on the 9 hour gap between event A and event C, and is independent of what occurred at event B (which has its own independent contribution).

The decay rate used by the neural-based transaction processing module 160 can be a parameter set by a user 150 (e.g., a data scientist) configuring the network (also called a "hyper-parameter" in machine learning). The decay rate can be chosen using a combination of intuition for the problem at hand, through trial-and-error experimentation (such as grid search), and/or based on any of a number of other factors. In certain example embodiments, the decay rate remains constant once it has been chosen during configuration.

In certain example embodiments, the neural-based transaction processing module 160 performs running aggregations over past actions within a set of time intervals that, in combination, encode observations of the transactional behavior of an entity (e.g., a credit card holder) within those time intervals and how they have changed. The changes in that transactional behavior can be categorized by the neural-based transaction processing module 160 as a fraudulent transaction.

As discussed above, an example of a time decay is an exponential time decay. For an exponential time-decay function f, the property $f(a+b)=f(a)f(b)$ holds. In certain example embodiments, an exponential time-decay can ensure that the contribution of a past action to the cell memory in the neural-based transaction processing module 160 depends solely on the elapsed time since the more recent event took place. In other words, the elapsed time between events attributable to an entity using example embodiments can be completely independent of any other action that has been performed in the intervening time. The use of time decay in the neural-based transaction processing module 160 also permits long-term memory storage, which is a significant limitation of the current art. The duration of the long-term memory storage can be set, for example, by the half-life parameter of the exponential time decay. In such a case, cells with a range of half-lives can be used, which encourages the encoding of behavioral information and changepoints over different time periods.

In certain example embodiments, the weighting module 170 of the transaction processing system 190 is configured to receive one or more inputs from one or more other components of the system 100. In this case, the weighting module 170 receives inputs in the form of payment (e.g., credit card) transactions in real time from one or more of the neural-based transaction processing module 160. In addition, the weighting module 170 is configured to send one or more outputs to one or more other components of the system 100. In this case, the weighting module 170 sends outputs to one or more clients 195, which can be the same clients 195 that sent the transaction information and/or different clients 195.

The weighting module 170 can have any of a number of configurations. For example, in this case, the weighting module 170 can be a multi-headed self-attention mechanism with unique treatment for irregularly spaced temporal data, such as what is output by the neural-based transaction processing module 160. For example, the weighting module 170 is configured to receive the outputs of a neural-based transaction processing module 160 for a current sample and, if applicable, previous samples in the sequence. The weighting module 170 produces its own outputs using one or more of a number of functions, including but not limited to time-windowed masking and a relative positional encoding that is a function of time (typically weighted or modified through a decay or factored function).

In certain example embodiments, the function of the weighting module 170 is to extract relevant context from specific previous actions in the action sequence. This provides a richer context for understanding (and properly characterizing) the current transaction. For example, the weighting module 170 may learn to increase a risk score for a login action, if the login action comes soon after a password reset action. In this example, the weighting module 170 would have learned that recent password reset actions are a specific and relevant context that changes the risk associated with a login action. Put another way, the weighting module 170 weights the influence of past data samples using a function of a time interval between the past data sample and the present, as implemented in the neural-based transaction processing module 160.

The extraction of relevant context is achieved by an attention mechanism of the weighting module 170. The attention mechanism can be a self-learning or trained algorithm that learns how to create a vector of context for which to search, as well as a vector of context that the current transaction represents. The weighting module 170 compares the search vector for the current transaction to the context vectors previously calculated for past transactions, and information on any matches between the search vectors and the previous context vectors is output by the weighting module 170.

In certain example embodiments, the neural-based transaction processing module 160 and/or the weighting module 170 can be sandwiched between one or more of the other transaction processing modules 165, which can include traditional neural network architectures. Such a configuration can allow the neural-based transaction processing module 160 and/or the weighting module 170 to be used for inference in a prediction problem. The parameters of all the neural-based transaction processing module 160 and/or the weighting module 170 can be trained using, for example, a traditional combination of stochastic gradient descent and back-propagation algorithms, operating with a logistic log-loss objective function. The training of the neural-based transaction processing module 160 and/or the weighting module 170 can be achieved using labelled training data.

For the neural-based transaction processing module 160 and/or the weighting module 170, the transaction stream can be discretized into separate sequences for the individual clients 195 involved in the transaction. Example embodiments, using the neural-based transaction processing module 160 and the weighting module 170, show deep behavioral networks using a deep neural network machine learning architecture for solving sequential problems with native treatment for transactions (samples) spaced at arbitrary and irregular intervals in time.

The neural-based transaction processing module 160 and the weighting module 170 can be used in some situations independently of each other. The neural-based transaction processing module 160 and the weighting module 170, as described herein, can provide greater accuracy and performance for anomalous behavior prediction in transactions and other similar commercial activities. Incorporating the example neural-based transaction processing module 160 and the example weighting module 170 into the more traditional and currently-used other transaction processing modules 165 creates a wider deep neural network architecture trained on transactional data. The neural-based transaction processing module 160 and the weighting module 170 compute indicators that capture behavioral norms, incorporate their changes over different time periods, and indicate the presence of behavioral anomalies. These indicators are learned and optimized by the algorithms, through the controller 104, rather than conceived of by a data scientist. This produces stronger fraud prediction models.

The storage repository 130 of the transaction processing system 190 can be a persistent storage device (or set of devices) that stores software and data used to assist the controller 104 in communicating with the users 150, the network manager 180, and the client(s) 195 within the system 200. In one or more example embodiments, the storage repository 130 stores one or more protocols, one or more algorithms, and stored data. The protocols can be any procedures (e.g., a series of method steps), logic steps, and/or other similar operational procedures that the controller 104 follows based on certain conditions at a point in time. The protocols can also include any of a number of communication protocols that are used to send and/or receive data between the controller 104 and the users 150, the network manager 180, the clients 195, and one or more other components of the transaction processing system 190.

The algorithms can be any formulas, mathematical models, forecasts, simulations, and/or other similar computational instruments that the controller 104 utilizes based on certain conditions at a point in time. One or more algorithms can be used in conjunction with, or as a result of following, one or more protocols. Stored data can be any data associated with the clients 195, data associated with account holders, data associated with credit card or other account numbers, threshold values, user preferences, results of previously run or calculated algorithms 232, and/or any other suitable data. Stored data can be any type of data, including but not limited to historical data, present data, and forecast data. The stored data can be associated with some measurement of time derived, for example, from the timer.

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols, the algorithms, and/or the stored data according to some example embodiments. Each storage unit or device can be physically located in the same or in a different geographic location.

The storage repository 130 can be operatively connected to the control engine 206. In one or more example embodiments, the control engine 206 includes functionality to communicate with the user 250, the network manager 280, the client(s) 195, and the sensor modules 260 in the system 200. More specifically, the control engine 206 sends information to and/or receives information from the storage repository 130 in order to communicate with the user 150, the network manager 180, the client(s) 195, and the sensor modules 260. As discussed below, the storage repository 130 can also be operatively connected to the communication module 208 in certain example embodiments.

The controller 104 controls the operation of one or more components (e.g., the communication module 208, the timer 210, the transceiver 224) of the transaction processing system 190. The controller 104 can provide control, communication, and/or other similar signals to the users 150, the network manager 180, and the clients 195. Similarly, the controller 104 can receive control, communication, and/or other similar signals from the users 150, the network manager 180, and the clients 195. In certain embodiments, the controller 104 can communicate with one or more components of a system external to the system 100.

Figure 2:
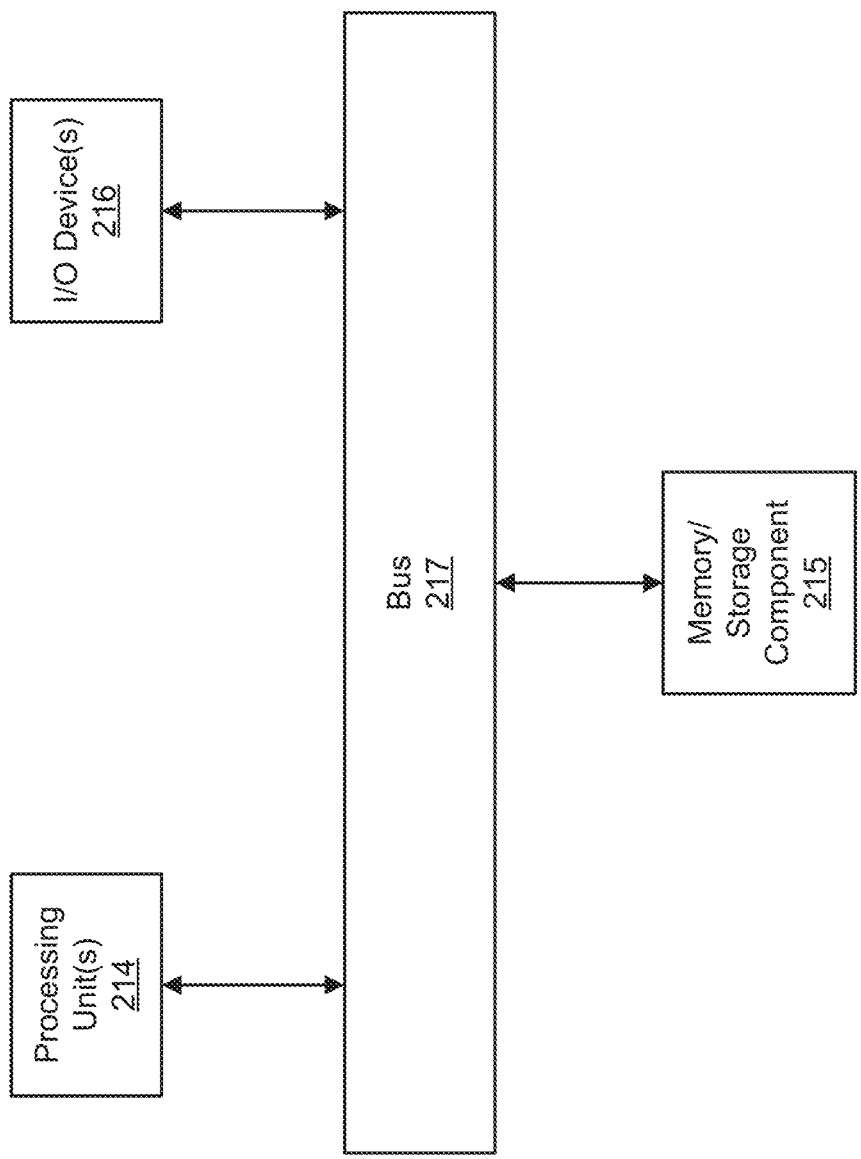
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, the controller 104 of FIG. 1 and its various components (e.g., hardware processor 120, memory 122, control engine 106) can be considered a computing device 218 as in FIG. 2. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
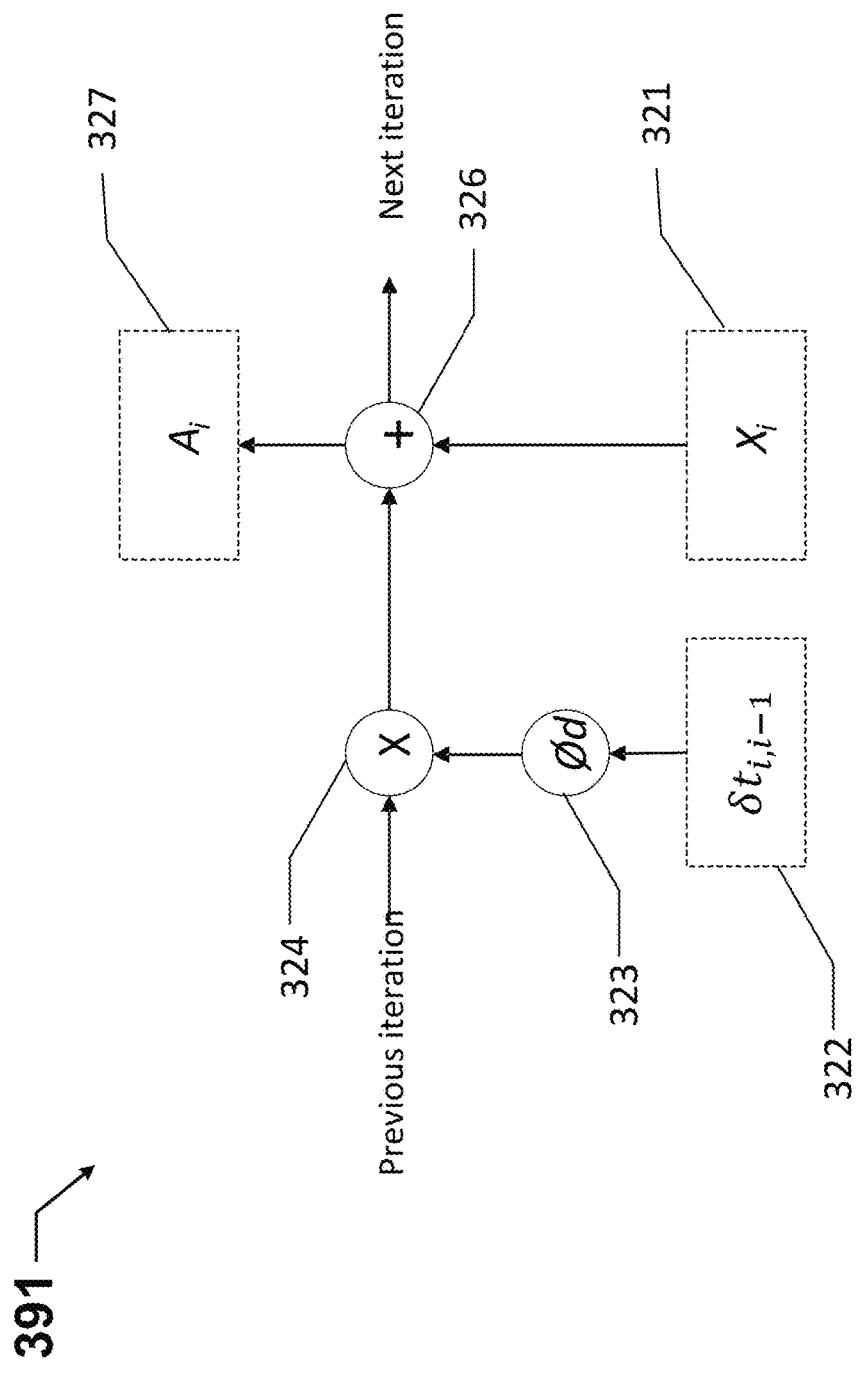
FIG. 3 shows a flowchart of a method for detecting fraud in accordance with certain example embodiments.

FIG. 3 shows a flowchart of a method 391 for detecting fraud in accordance with certain example embodiments. Specifically, referring to FIGS. 1 through 3, the method 391 shows an example of the functionality of the neural-based transaction processing module 160. The method 391 starts at step 321, where the neural-based transaction processing module 160 receives a record (e.g., information associated with a currently-attempted payment charge) from a client 195. Here, the record may be a first information that the neural-based transaction processing module 160 received for the processing. The current iteration is indexed by i, and the previous iteration, as shown in step 322, in the sequence is indexed by i−1. In step 322, the neural-based transaction processing module 160 retrieves numbers and other information associated with the account used to make the current transaction are retrieved from, as stored in the storage repository 130. In this example, the retrieved numbers and other information associated with the account used to make the current transaction may be a second information that the neural-based transaction processing module 160 received for the processing. The numbers and other information can summarize the state of the account. In certain example embodiments, the last time that this account state was updated was when the previous transaction for the account was processed. The state is a learned representation of the account's previous activities. This information may, or may not, include specific information about the previous transaction.

In step 323, after the weighting module 170 receives the second information in step 322 (after the information is processed by the neural-based transaction processing module 160), a weighting function $\phi_d$ is computed by the weighting module 170 from the time interval $\delta t_{i,i-1}$ between the previous iteration and the current one. The computed weighting function $\phi_d$ may perform as a time-decayed algorithm of the method 391. In step 324, the previous iteration memory is multiplied by $\phi_d$ by the controller 104 or the weighting module 170, and then in step 326 the product of step 324 is added by the controller 104 or the weighting module 170 to the layer input $X_i$ from step 321. In step 327, the updated quantity, $A_i$, is output from the weighting module 170 to other transaction processing modules 165 (e.g., other neural components) in the transaction processing system 190 and saved to the storage repository 130 (e.g., cell memory) for use by the next iteration in the sequence. In this example, the updated quantity $A_i$, may be a third information generated by the neural-based transaction processing module 160.

Figure 4:
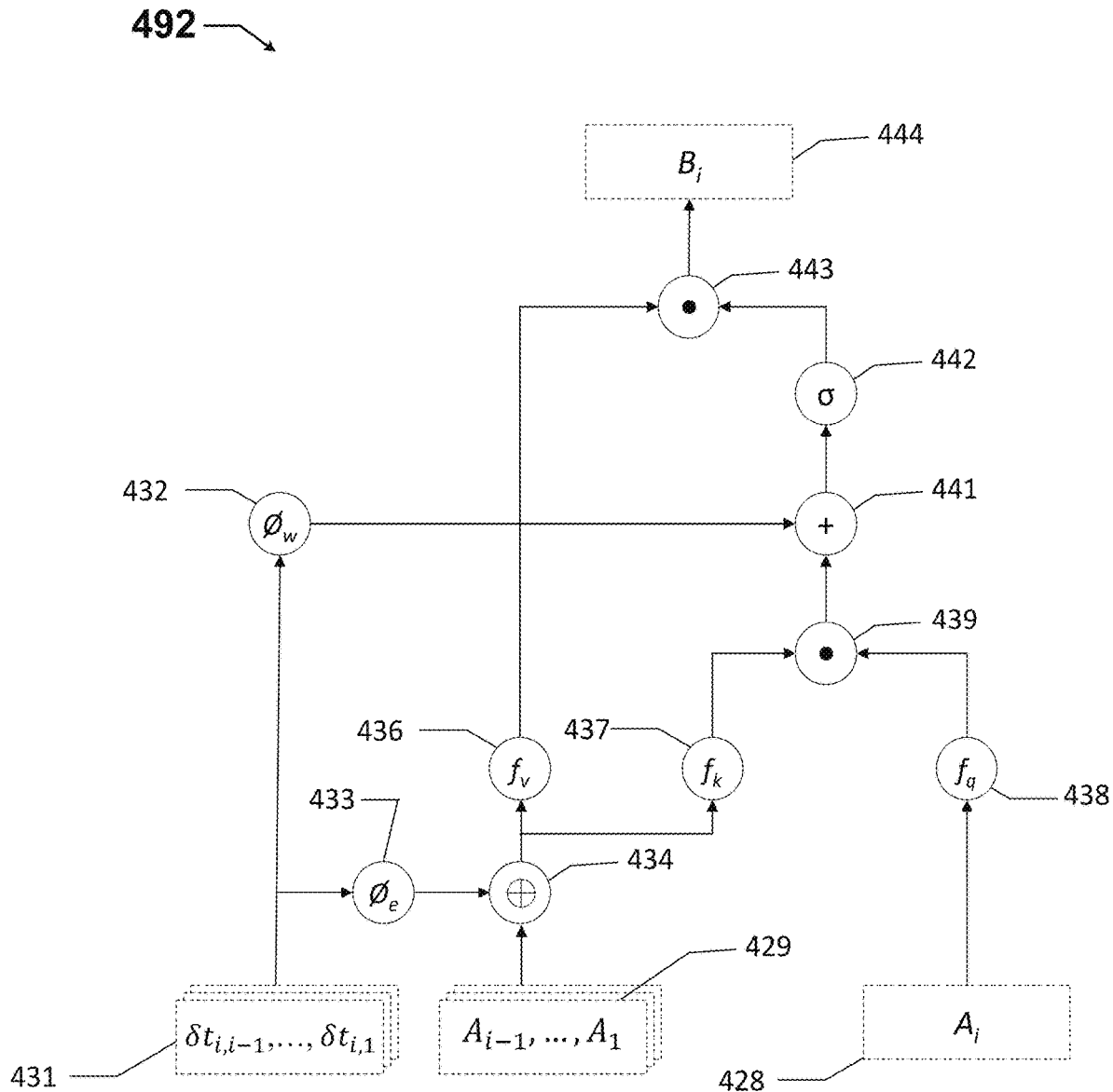
FIG. 4 shows a flowchart of another method for detecting fraud in accordance with certain example embodiments.

FIG. 4 shows a flowchart of another method 492 for detecting fraud in accordance with certain example embodiments. Referring to FIGS. 1 through 4, the method 492 uses the neural-based transaction processing module 160 and the weighting module 170. The architecture used to perform the method 492 of FIG. 4 is of a single self-attention head that is the building block of the weighting module 170. At least some of the novel components of the method 493 are indicated in red, specifically in steps 431 through 434 and 441. These components provide native support for irregular time spacing of the transaction sequence. In step 431, the neural-based transaction processing module 160 and the weighting module 170 combine to read a vector of the relative time intervals $\delta t_{i,i-1} \ldots \delta t_{i,1}$ between each of the previous iterations in the sequence (as shown in step 429) and the current iteration i (as shown in step 428).

From these, in step 433, a vector of relative time encodings $\phi_e$ is computed for each of the previous samples from step 431. In step 434, the result of step 433 is concatenated with the vector of layer inputs $A_{i-1} \ldots A_1$ from each of the previous transactions in the sequence of step 429. In step 432, the intervals $\delta t_{i,i-1} \ldots \delta t_{i,1}$ to are also used to define a weighting $\phi_w$. As usual in attention mechanisms, the scalar product of the key vector $f_k$ (in step 437) and query vector $f_q$ (in step 438) for each of the samples in the sequence is computed to produce a vector of attention scores, as in step 439. In this example, the vector of attention scores may be a fourth information that is generated by applying the query vector $f_q$ on the received third information (in step 428).

In step 441, the weighting $\phi_w$ is then applied to this vector of attention scores. This is important because it encourages the architecture to attend more heavily to samples in some time intervals (e.g., around a week before the current sample) more than others. In step 442, the modified attention scores are then normalized by a softmax layer (denoted by σ) to produce attention weights. In step 444, these are in the end utilized to produce a context vector $B_i$ by appropriately weighting value vectors $f_v$ from the previous samples in the sequence, as shown in step 443. Here, the multiplication of the weighting $\phi_w$ and the vector of attention scores in step 441, as well as the calculation of the context vector $B_i$ in step 443, are processing algorithms that are used to generate the output of the fraud detection method 492.

The amount of time that example embodiments perform the method 391 of FIG. 3 and the method 492 of FIG. 4 is on the order of seconds, or even a fraction of a second. This timing is important in order to detect a fraudulent transaction in real time before the transaction can be approved and completed and to give the client and/or other relevant entities (e.g., law enforcement) a better chance of identifying and holding to account the person responsible for the fraud. As a result, in view of at least the above, the example embodiments described herein cannot reasonably be viewed as an abstract idea directed toward, for example, organizing human activity or a fundamental economic activity because the speed at which this activity must be performed is far too short for a human to implement.

Figure 5:
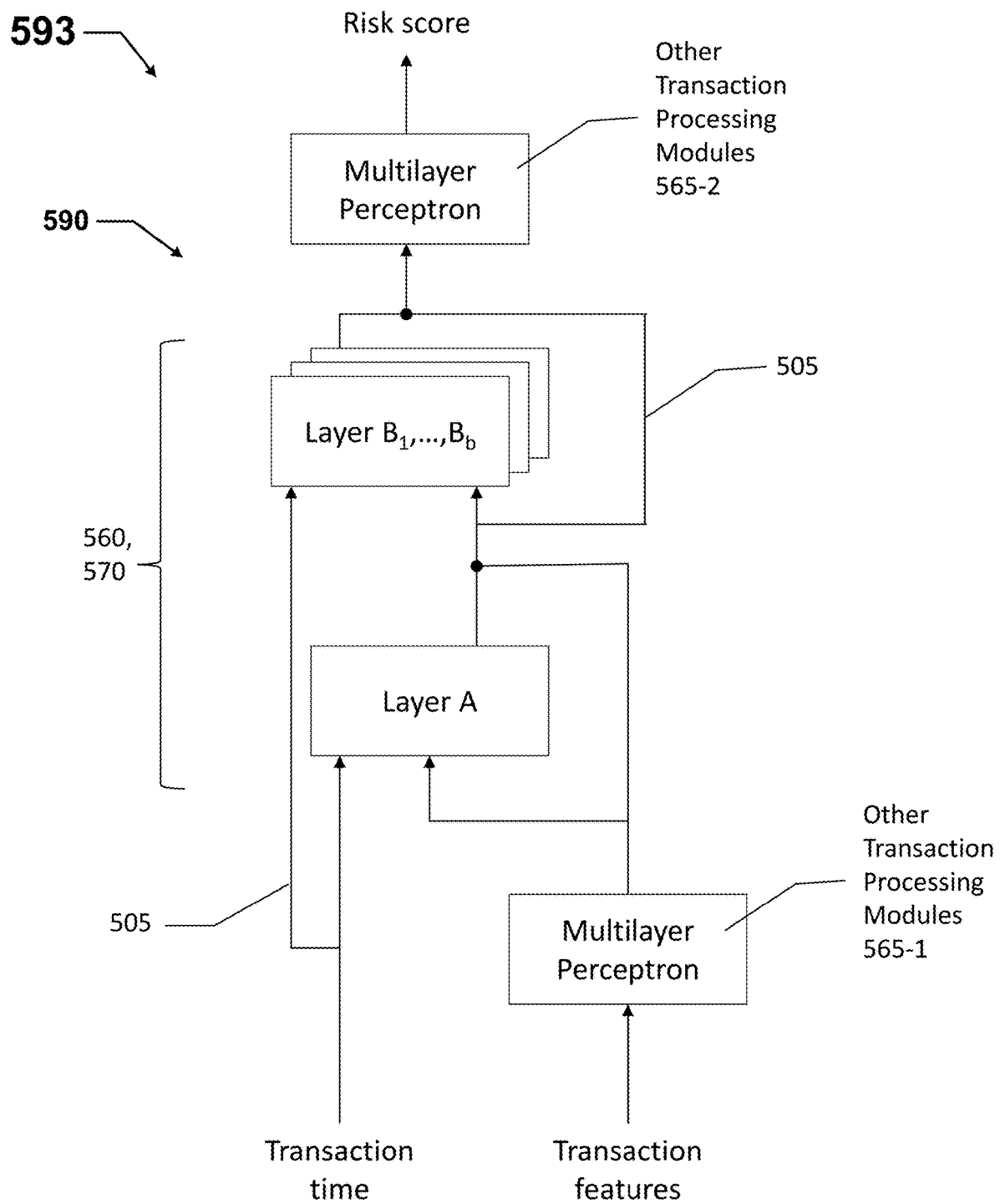
FIG. 5 shows a flowchart of a method for detecting fraud in accordance with certain example embodiments.

FIG. 5 shows a process flow diagram 593 of a system for detecting fraud in accordance with certain example embodiments. Referring to FIGS. 1 through 5, the other transaction processing modules 565, the neural-based transaction processing module 560, the weighting module 570, and the communication links 505 are substantially similar to the other transaction processing modules 165, the neural-based transaction processing module 160, the weighting module 170, and the communication links 105 of FIG. 1 above. The other transaction processing modules 565, the neural-based transaction processing module 560, the weighting module 570, and the communication links 505 are part of a transaction processing system 590, which is substantially similar to the transaction processing system 190 of FIG. 1 above.

Referring to FIG. 5, the work of the neural-based transaction processing module 560 and the weighting module 570 is divided into two layers: Layer A and layer B. Some information (e.g., transaction time, account number) associated with an imminent transaction is received (e.g., from a client 195) by layer A, and information associated with the imminent transaction is received by part of (or one of) the other transaction processing modules 565-1. The information received by layer A and the other transaction processing modules 565-1 can be the same or different than each other. The information is transmitted over communication links 505.

The output of layer A, which includes involvement of the neural-based transaction processing module 560 and/or the weighting module 570, can be sent, using communication links 505, to layer B and/or to part of (or one of) the other transaction processing modules 565-2. In addition to the output from layer A, layer B can receive information associated with the imminent transaction from the client 195. The output of layer B, which includes involvement of the neural-based transaction processing module 560 and/or the weighting module 570 is sent, using communication links 505, to the other transaction processing modules 565-2. The output of the other transaction processing modules 565-2 in this case is a risk score that indicates to the client 195 whether the imminent transaction is fraudulent.

Figure 6:
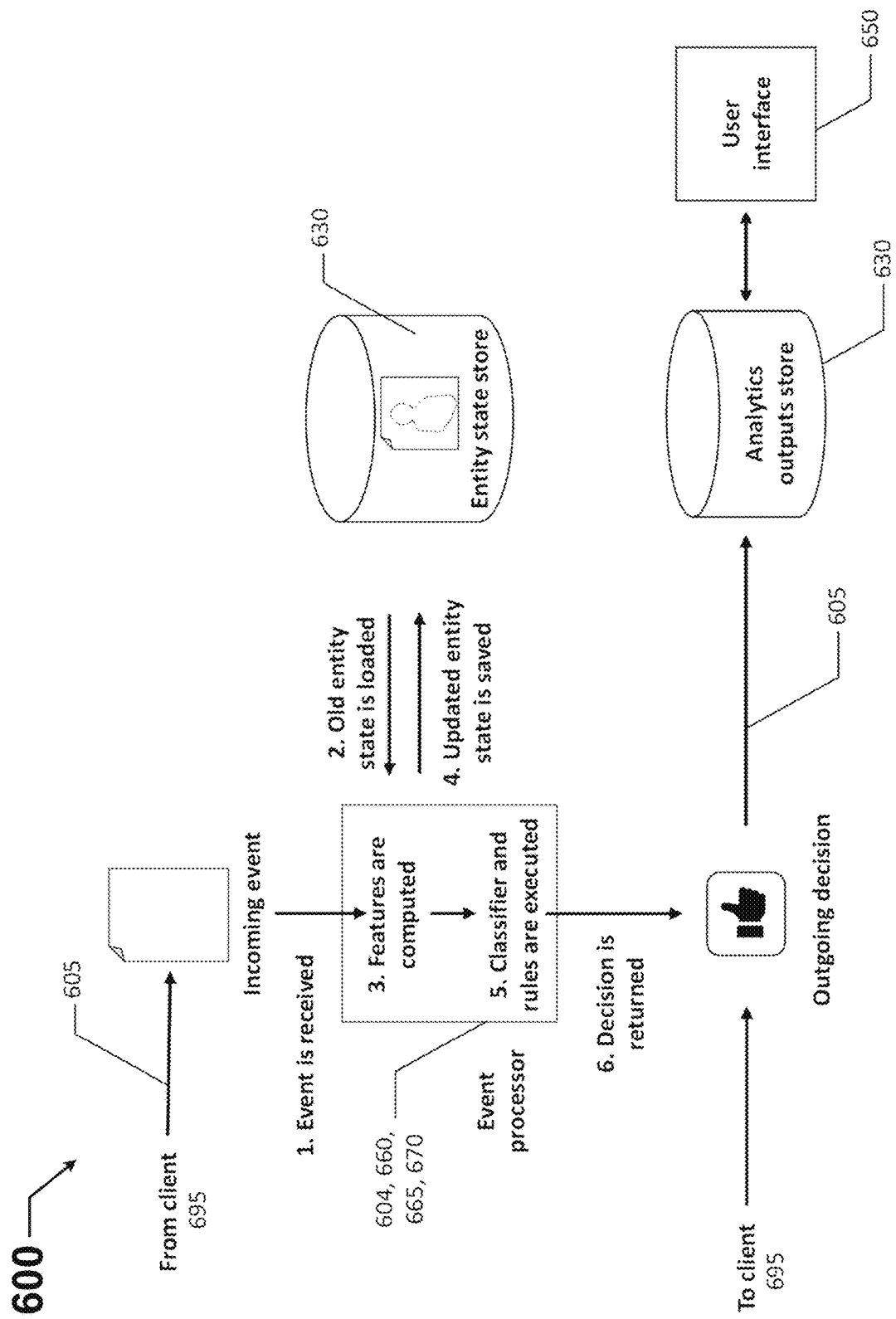
FIG. 6 shows a flowchart of another method for detecting fraud in accordance with certain example embodiments.

FIG. 6 shows a flow of data within a system 600 used to detect fraud in accordance with certain example embodiments. Referring to FIGS. 1 through 6, the transaction processing system 690, the controller 604, the other transaction processing modules 665, the neural-based processing module 660, the weighting module 670, the storage repository 630, the client 695, the user 650, and the communication links 605 are substantially similar to the corresponding components of FIG. 1 above.

FIG. 6 illustrates how example embodiments (in this case, the neural-based processing module 660 and the weighting module 670) fit into a wider transaction fraud scoring system. The structure of FIG. 6 describes a transaction processing system that takes a data packet (a transaction) from the transaction processing system of a client 695, runs internal operations where the storage repository 630 (which includes an entity state database) is queried and updated in the light of the new transaction information, a classification is performed, rules are executed and a decision is returned in a data packet sent to the client 695. The system 600 also updates an analytics database (part of the storage repository 630), which users 650 (e.g., fraud analysts working for the client 695) can query via a user interface.

The whole process from receipt of the data packet from the client 695 to return of a decision packet to the client 695 is measured by the system latency, which is typically a matter of milli-seconds ("real-time, as defined herein). In this case, the transaction processing system 690 uses the output provided by the neural-based processing module 660 and the weighting module 670 to make a fraud/no-fraud classification, and to perform one or more actions based on customer-specified rule logic.

Example embodiments can provide, in real time, an output that is used as a factor by other components of a system or by another system to determine if a particular transaction is fraudulent. In addition, or in the alternative, example embodiments can provide, in real time, a determination as to whether a particular transaction is fraudulent. In some cases, as in the examples described herein, the example neural-based processing module and the example weighting module work in conjunction with each other. In alternative embodiments, one of the example neural-based processing module and the example weighting module are omitted from a system.

Many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A fraud detection transaction processing system communicably coupled with a client and a user via one or more communication links, the fraud detection transaction processing system comprising:

a neural-based transaction processing module, which is a layer of neural cells with local memory where the memory is time-decayed prior to state updates upon processing of a new sample, the neural-based transaction processing module configured to:

receive, from the client over the one or more communication links, first information associated with a first proposed electronic transaction, the first proposed electronic transaction constituting the new sample for a given iteration, retrieve, from a communicably coupled storage repository, second information associated with at least one prior electronic transaction that is associated with the first proposed electronic transaction, and generate third information by calculating, using a controller executing on a hardware processor and associated with, and executable by, the neural-based transaction processing module, an exponential time-decayed algorithm using the second information, wherein calculating the exponential time-decayed algorithm in a current iteration causes the local memory to be time-decayed, exponentially, and comprises invoking a weighting module to compute a weighting function from a time interval between the at least one prior electronic transaction and the first proposed electronic transaction, multiplying an output of a previous iteration of calculating the exponential time-decayed algorithm to the weighting function by the weighting module or a controller of the transaction processing system, wherein the output of a previous iteration of calculating the exponential time-decayed algorithm is an exponential time-decayed algorithm calculated in the previous iteration, the exponential time-decayed algorithm calculated in the previous iterations providing long-term retention, for a duration set by a half-life parameter of said exponential time-decayed algorithm, of contributions of prior transactions that are not the most recent transaction, and adding the multiplication result and the received first information of the first proposed electronic transaction by the weighting module or the controller to update the exponential time-decayed algorithm, thereby generating third information in the current iteration, which comprises a weighted summation of the first proposed electronic transaction relative to the prior transactions; and wherein the fraud detection transaction processing system further comprises the weighting module, the weighting module communicably coupled to the neural-based transaction processing module, and wherein the weighting module is configured to:

generate fourth information by receiving the third information from the neural-based transaction processing module, and applying a weighting factor to the third information, calculate at least one processing algorithm using the first information and the fourth information to generate an output including a risk score that is indicative of whether the first proposed electronic transaction is fraudulent; and provide the output to the client, over the one or more communication links, to flag to the client while the first proposed electronic transaction is in-flight, before the first proposed electronic transaction is completed, whether the first proposed electronic transaction is fraudulent, wherein a total latency of the fraud detection transaction processing system, as defined by a duration between a time of a receipt of the first information by the neural-based transaction module and a time of a corresponding provision of the output to the client, is a matter of milli-seconds.

2. The fraud detection transaction processing system of claim 1, wherein the receiving of the third information from the neural-based transaction processing module includes receiving third information from the current iteration and receiving third information from each of previous iterations.

3. The fraud detection transaction processing system of claim 2, wherein the neural-based transaction processing module and the weighting module are configured to combine to read a vector of relative time intervals between each of the previous iterations and the current iteration.

4. The fraud detection transaction processing system of claim 3, wherein the weighting module is further configured to compute a vector of relative time encodings based on the read vector of relative time intervals and concatenate the vector of relative time encodings with the received third information from each of the previous iterations.

5. The fraud detection transaction processing system of claim 4, wherein the weighting module is further configured to produce a key vector based on the concatenation result, produce a query vector based on the received third information in the current iteration, and generate a vector of attention scores based on the key vector and the query vector.

6. The fraud detection transaction processing system of claim 5, wherein the weighting module is further configured to apply a weighting vector to the vector of attention scores to generate a modified vector of attention scores, and wherein the weighting vector is defined based on the vector of relative time intervals between each of the previous iterations and the current iteration.

7. The fraud detection transaction processing system of claim 6, wherein the neural-based transaction processing module is further configured to normalize the modified vector of attention scores to produce attention weights, and wherein the normalization is conducted in a softmax layer of the neural-based transaction processing module.

8. The fraud detection transaction processing system of claim 7, wherein the weighting module is further configured to generate a value vector based on the concatenation result, and produce a context vector by weighting the value vector with the modified vector of attention scores, wherein the output comprises the context vector.

9. A method for detecting a fraudulent transaction using a fraud detection transaction processing system communicably coupled with a client and a user via one or more communication links, the method comprising:

receiving, by a neural-based transaction processing module, which is a layer of neural cells with local memory where the memory is time-decayed prior to state updates upon processing of a new sample, the neural-based transaction processing module, first information associated with a first proposed electronic transaction from the client over the one or more communication links, the first proposed electronic transaction constituting the new sample for a given iteration, wherein the first information from the client comprises a currently attempted payment charge, including an account number, an account owner, a day and time of the first proposed electronic transaction, an amount of the first proposed electronic transaction, a location of where the first proposed electronic transaction is occurring, a vendor seeking authorization of the charge, or manner in which the transaction is executed;

retrieving, by the neural-based transaction processing module from a communicably coupled storage repository, second information, wherein the second information comprises a state of an account used to make the first proposed electronic transaction, the state of the account indicative of a duration from at least one prior electronic transaction that is associated with the first proposed electronic transaction;

generating third information by calculating, using a controller executing on a hardware processor and associated with and executable by the neural-based transaction processing module, an exponential time-decayed algorithm using the second information, wherein the calculating of the exponential time-decayed algorithm in a current iteration causes the local memory to be time-decayed, exponentially, and comprises invoking a weighting module to compute a weighting function from a time interval between the at least one prior electronic transaction and the first proposed electronic transaction, multiplying, by the weighting module or the controller of the transaction processing system, an output of a previous iteration of calculating the exponential time-decayed algorithm to the weighting function, wherein the output of a previous iteration of calculating the exponential time-decayed algorithm is a time-decayed algorithm calculated in the previous iteration, the exponential time-decayed algorithm calculated in the previous iterations providing long-term retention, for a duration set by a half-life parameter of said exponential time-decayed algorithm, of contributions of prior transactions that are not the most recent transaction, and adding, by the weighting module or the controller, the multiplication result and the received first information of the first proposed electronic transaction to update the exponential time-decayed algorithm, thereby generating the third information in the current iteration, which comprises a weighted summation of the first proposed electronic transaction relative to the prior transactions;

generate fourth information by receiving, by the weighting module, the third information from the neural-based transaction processing module, applying, by the weighting module, a weighting factor to the third information to generate fourth information;

calculating, by the weighting module, at least one processing algorithm using the first information and the fourth information to generate an output including a risk score that is indicative of whether the first proposed electronic transaction is fraudulent; and providing, by the weighting module or the neural-based transaction processing module, the output to the client, over the one or more communication links, to flag to the client while the first proposed electronic transaction is in-flight, and before the first proposed electronic transaction is completed, whether the first proposed electronic transaction is fraudulent, wherein a total latency of the fraud detection transaction processing system, as defined by a duration between a time of a receipt of the first information by the neural-based transaction module and a time of a corresponding provision of the output to the client, is a matter of milli-seconds.

10. The method for detecting a fraudulent transaction of claim 9, wherein the receiving of the third information from the neural-based transaction processing module includes receiving third information from the current iteration and receiving third information from each of previous iterations.

11. The method for detecting a fraudulent transaction of claim 10, further comprising combining to read, by the neural-based transaction processing module and the weighting module, a vector of relative time intervals between each of the previous iterations and the current iteration.

12. The method for detecting a fraudulent transaction of claim 11, further comprising:
   computing, by the weighting module, a vector of relative time encodings based on the read vector of relative time intervals; and
   concatenating the vector of relative time encodings with the received third information from each of the previous iterations.

13. The method for detecting a fraudulent transaction of claim 12, further comprising:
   producing, by the weighting module, a key vector based on the concatenation result;
   producing, by the weighting module, a query vector based on the received third information in the current iteration; and
   generating, by the weighting module, a vector of attention scores based on the key vector and the query vector.

14. The method for detecting a fraudulent transaction of claim 13, further comprising applying, by the weighting module, a weighting vector to the vector of attention scores to generate a modified vector of attention scores, wherein the weighting vector is defined based on the vector of relative time intervals between each of the previous iterations and the current iteration.

15. The method for detecting a fraudulent transaction of claim 14, further comprising normalizing, by the transaction processing module, the modified vector of attention scores to produce attention weights, wherein the normalization is conducted in a softmax layer of the transaction processing module.

16. The method for detecting a fraudulent transaction of claim 15, further comprising:
   generating, by the weighting module, a value vector based on the concatenation result; and
   producing, by the weighting module, a context vector by weighting the value vector with the modified vector of attention scores,
   wherein the output comprises the context vector.

* * * * *